Oct. 31, 1950    S. B. PICKLES    2,527,570
GLIDE PATH SYSTEM

Filed Dec. 1, 1947    2 Sheets-Sheet 1

INVENTOR.
SIDNEY PICKLES
BY
*Robert Harding Jr.*
ATTORNEY

Oct. 31, 1950     S. B. PICKLES     2,527,570
GLIDE PATH SYSTEM

Filed Dec. 1, 1947     2 Sheets-Sheet 2

INVENTOR.
SIDNEY PICKLES
BY
ATTORNEY

Patented Oct. 31, 1950

2,527,570

UNITED STATES PATENT OFFICE 2,527,570

GLIDE PATH SYSTEM

Sidney B. Pickles, Jackson Heights, N. Y., assignor to International Standard Electric Corporation, New York, N. Y., a corporation of Delaware Application December 1, 1947, Serial No. 789,108

11 Claims. (Cl. 250—33.53)

The present invention relates to glide path systems and, more particularly, to an antenna arrangement for setting up a predetermined glide path in aircraft homing systems.

In equisignal glide path systems heretofore proposed it has been shown that any desired glide path along a course may be secured by two antenna arrays spaced to one side of the landing course or runway, by a proper relationship of the ratio of the upper and lower lobe energy along the course. To achieve this proportioning of the energy it has been necessary in the past to adjust at the site of the beacon the characteristics of the radiating antennas. It has not been possible to calculate in advance with any degree of accuracy the antenna constants and feeding circuits for obtaining the desired radiation distribution.

An object of the invention is to provide an antenna arrangement which may be readily calculated for any given glide path angle, and which, having once been calculated, may be conveniently expanded for greater effectiveness without change in the calculation.

According to a feature of my invention I provide two arrays having patterns satisfying the ratio needed to supply the desired radiations along the glide path, at least one of these units constituting an array at right angles to the course line.

The arrays constitute an upper antenna corresponding to a three element binomial array and a lower single antenna, or corresponding binomial expansions of both said antenna arrays.

The above and other objects will become apparent as the description proceeds, reference being had to the accompanying drawing in which.

Figure 1:
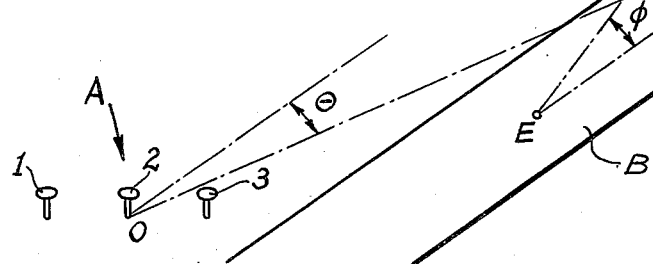
Fig. 1 is a perspective diagrammatic view of a glide path system.

Referring to Fig. 1, an antenna array generally indicated at A is shown laterally displaced from a runway B. An aircraft C approaches the runway on a glide path D, making an angle $\phi$ with the runway which it intersects at a point E. The horizontal angle of the direction of the aircraft with the runway, measured from the center O of the antenna array, is designated $\theta$.

Using two vertically spaced antenna arrays A1, A2 centered on O, it has been determined that an equisignal path of elevation $\theta$, defining a desired straight line glide path D, can be obtained if the horizontal patterns $R1'(\theta)$, $R2'(\theta)$ of arrays A1, A2, respectively, are related according to the formula $$\frac{R2'(\theta)}{R1'(\theta)} = F(\theta) = \frac{\sin(hK \cos \theta)}{\sin(HK \cos \theta)} \qquad (1)$$

$h$ and $H$ being the height of respectively the lower array A1 and the upper array A2 above ground and $K$ being the tangent of the glide path angle $\phi$.

Except for the trivial solution $H=h$ in which the factor $K$ remains, of course, indeterminate, the right-hand member of Equation 1 represents a function which goes from a value of 1, for $\theta=0°$, to a value of $$\frac{h}{H} < 1$$

for $\theta=90°$. A function $F(\theta)$ having this characteristic and substantially fulfilling Equation 1 is given by the expression $$F(\theta) = a + b \cos(d \sin \theta) \qquad (2)$$

which represents a "dumbbell" pattern of radiation such as may be obtained from three spaced antennae 1, 2, 3 (Fig. 1), $a$ being the amplitude of current in the center antenna 2, $b$ being twice the amplitude of current in each of the outer antennae 1, 3, and $d$ being the center spacing of adjacent antennae.

Thus, if the lower antenna array A1 (not shown in Fig. 1) is given a circular horizontal pattern $R1'(\theta)=1$, it follows from Equations 1 and 2 that $$R2'(\theta) = F(\theta) = a + b \cos(d \sin \theta) \qquad (3)$$

i. e. the upper antenna array A2 may have the form of array A in Fig. 1.

Figure 2:
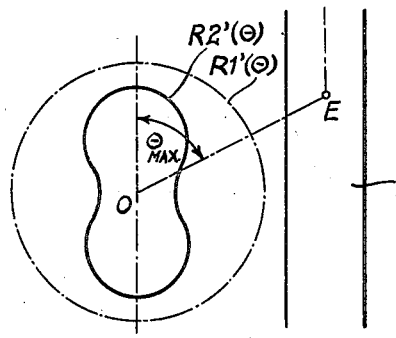
Fig. 2 shows the horizontal patterns of radiation of a pair of antenna arrays according to the invention.
Figure 3:
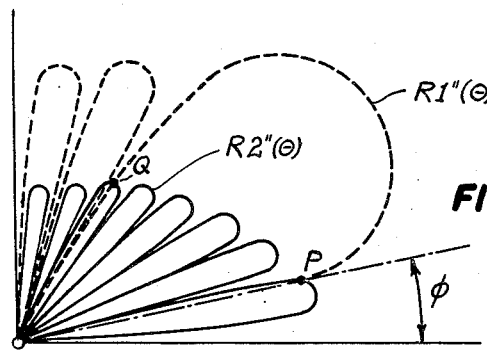
Fig. 3 shows the corresponding vertical patterns in polar coordinates.

In Fig. 2 there is shown in dotted lines the circular pattern $R1'(\theta)$ from a lower array A1 and in full lines the dumbbell pattern $R2'(\theta)$ from an upper array A2; the corresponding vertical patterns being shown at $R1''(\theta)$, $R2''(\theta)$, respectively, in Fig. 3. The patterns in Fig. 3 are drawn in polar coordinates, an equisignal path being defined by the point of intersection P between the two patterns which occurs at an angle of elevation $\phi$. Each of the two patterns may be a multi-lobe pattern as shown, the pattern $R2''(\theta)$ having the greater number of lobes due to the greater distance of array A2 from ground. Other points of intersection will of course exist, but with proper design the nearest such point Q can be made to occur at a sufficiently high angle of elevation so as not to be mistaken for the glide path.

Figure 4:
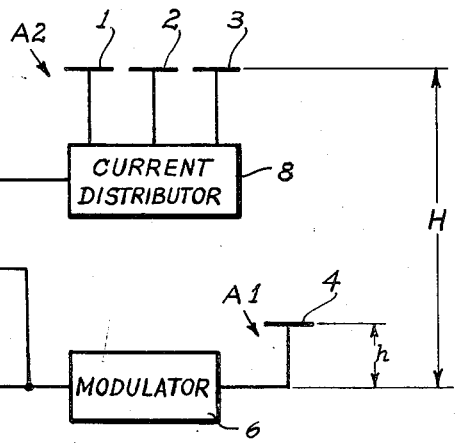
Fig. 4 is a circuit diagram for producing the patterns of Figs. 2 and 3.

Fig. 4 shows an embodiment of the invention in which, in addition to the three antennae 1, 2 and 3 forming the array A2, there is provided a single omnidirectional antenna 4 representing the array A1. A common source of radio frequency 5 feeds two modulators 6, 7 of which the first supplies energy to the antenna 4 while the second, by way of a current distributor 8, effects the energization of the three antennae 1, 2 and 3. With proper selection of the heights $h$ and $H$, of arrays A1 and A2 respectively, a desired glide path angle may be obtained.

Each of the arrays A1, A2 may now be made the basis of a much larger array $(A1)^n$, $(A2)^n$ in which the elemental units A1, A2, respectively, are multiplied in accordance with a binomial expansion of the $(n-1)$st power. The principle of binomial expansion is illustrated in the following table for the single-antenna array A1:

*Table I*

| | | | | | |
|---|---|---|---|---|---|
| $n_1=1$ | o | | | | |
| | 1 | | | | |
| $n_1=2$ | o | | o | | |
| | 1 | | 1 | | |
| $n_1=3$ | o | | | | |
| | | | o | | o |
| | o | | o | | o |
| | 1 | | 2 | | 1 |
| $n_1=4$ | o | | o | | o |
| | | | o | o | o |
| | o | o | o | o | |
| | 1 | 3 | 3 | 1 | |
| $n_1=5$ | o | o | o | o | |
| | | o | o | o | o |
| | o | o | o | o | o |
| | 1 | 4 | 6 | 4 | 1 |

The same principle applied to the array A2 as basic element of the binomial expansion gives the following result:

*Table II*

$n_2=1$  o------o------o
    $\frac{b}{2}$   $a$   $\frac{b}{2}$ $n_2=2$  o------o------o
         o------o------o
    o------o------o------o
    $\frac{b}{2}$  $a+\frac{b}{2}$  $a+\frac{b}{2}$  $\frac{b}{2}$ $n_2=3$  o------o------o------o
          o------o------o------o
    o------o------o------o------o
    $\frac{b}{2}$  $a+b$  $2a+b$  $a+b$  $\frac{b}{2}$ $n_2=4$  o------o------o------o
         o------o------o------o------o
    o------o------o------o------o------o
    $\frac{b}{2}$  $a+3\frac{b}{2}$  $3a+2b$  $3a+2b$  $a+3\frac{b}{2}$  $\frac{b}{2}$ $n_2=5$  o------o------o------o------o
         o------o------o------o------o------o
    o------o------o------o------o------o------o
    $\frac{b}{2}$  $a+2b$  $4a+7\frac{b}{2}$  $6a+4b$  $4a+7\frac{b}{2}$  $a+2b$  $\frac{b}{2}$ It can be shown that the formula for the horizontal pattern for a binomial array of the $n$th order, based upon an elemental array having a pattern $R'(\theta)$, will be $$R'(\theta)2^n \cos^n (d \sin \theta)$$

$d$ being again the center spacing between adjacent antennae. Hence, if the two basic arrays A1, A2 be replaced, respectively, by the complex arrays $(A1)^n$, $(A2)^n$ the left-hand side of Equation 1 will assume the form $$\frac{R2'(\theta)2^n \cos^n (d \sin \theta)}{R1'(\theta)2^n \cos^n (d \sin \theta)}$$

which reduces to $$\frac{R2'(\theta)}{R1'(\theta)}=F(\theta)$$

Thus the conditions for obtaining a desired glide path angle are preserved.

Figure 5:
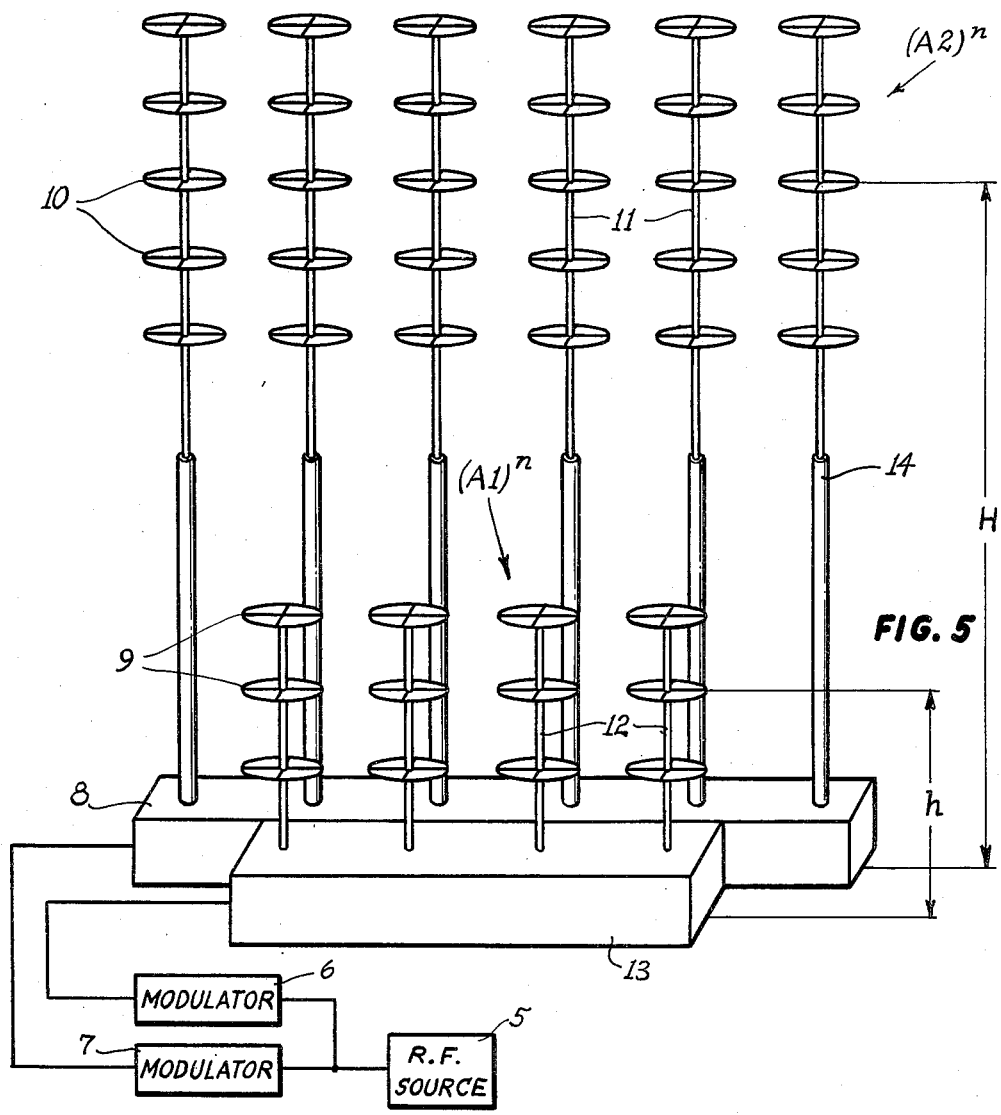
Fig. 5 illustrates a more complex antenna arrangement according to the invention.

It will be noted that the expanded arrays differ by the same number of antennae as the basic arrays, in the present case two. While the horizontal expansion in the manner described will serve to sharpen the horizontal radiation characteristics of the system, vertical expansion may also be resorted to in order to accentuate the major lobes of the vertical patterns without interfering with the horizontal field distribution. Fig. 5 shows such an arrangement in which both the upper and the lower antennae array have been expanded in the horizontal as well as in the vertical direction.

The lower antenna array $(A1)''$, Fig. 5, consists of twelve radiators 9 arranged in three horizontal rows, each row representing a binomial array of the fourth order based upon the omnidirectional antenna 4 (Fig. 4) as its elementary unit. Similarly, the upper array $(A2)^n$ consists of thirty radiators 10 arranged in five horizontal rows, each developed from the basic array A2 (Fig. 4), comprising the antennae 1, 2 and 3, in a binomial expansion of the fourth order. The elements 10 of the upper array are mounted on vertical feeders 11 rising from the current distributor 8; in analogous manner, the elements 9 of the lower array are mounted on vertical feeders 12 which rise from a second current distributor 13. Shields 14 may be used to screen the lower array from the feeders 11.

Figure 6:
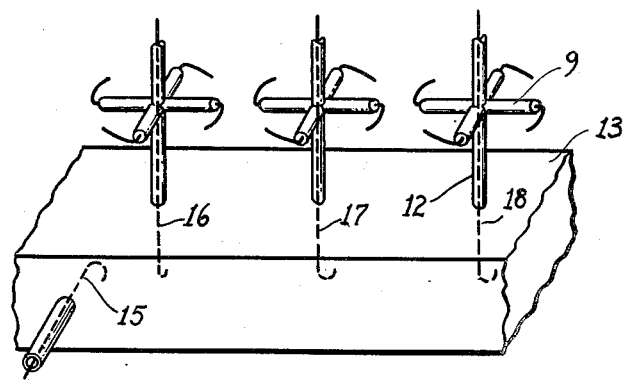
Fig. 6 shows, on a larger scale, the feeding means that may be used to energize an antenna array such as shown in Fig. 5.

In the case of ultra high frequencies, e. g. frequencies in the order of 1000 megacycles or higher, the current distributors of Fig. 5 may take the form illustrated in Fig. 6. Here the distributor 13, shown in part, comprises a dielectric wave guide having an input loop 15 and several output loops 16, 17, 18 through which energy is applied to the various radiators 9 over respective vertical feeders 12. The output loops 16, 17, 18 will be seen to vary in size to provide different coupling whereby the amplitudes of the current in each feeder may be controlled in accordance with its position in the binomial array. Thus, if it be assumed that the loop 16 is associated with the leftmost feeder 12 in Fig. 5, it will be seen from Table I that the energization of that feeder should be one-third that of the adjoining feeders associated with loops 17 and 18. In this simple manner the correct energization of each vertical row of antennae and, thereby, the distribution of energy in accordance with the desired horizontal pattern will be insured.

The distributor 8 of Fig. 4 or 5 may be designed in analogous manner.

It is to be understood that the invention is not limited to the particular embodiments shown and described and that various modifications and adaptations thereof will be possible without departure from the spirit and scope of the invention as defined in the objects and in the appended claims.

What is claimed is:

1. In an equi-signal glide path system, an antenna arrangement for defining vertical guiding course for aircraft comprising a first array and a second array, arranged one above the other the horizontal patterns of radiation of the two arrays having different directivity characteristics and being related substantially according to the formula $$\frac{R2'(\theta)}{R1'(\theta)} = a + b \cos (d \sin \theta)$$

wherein $a$, $b$ and $d$ are constants, $R1'\theta$ and $R2'\theta$ are the horizontal directivity patterns of the lower and upper array, respectively, and $\theta$ is a horizontal angle with respect to a line of reference, at least one of said arrays comprising a plurality of antennae disposed along a line transverse to said line of reference.

2. In a glide path system, the antenna arrangement according to claim 1 wherein said two arrays are laterally displaced from a runway intersecting with the glide path.

3. In a glide path system, the antenna arrangement according to claim 1 wherein said first array comprises a single antenna having a substantially circular horizontal pattern and said second array comprises three horizontal spaced antennae having a dumbbell-shaped horizontal pattern, $d$ being the spacing between the centers of adjacent antennae, $a$ being the amplitude of current in the center antenna and $b$ being twice the amplitude of current in each of the outer antennae of said second array.

4. In a glide path system, the antenna arrangement according to claim 1 wherein said first array comprises a binomial expansion of a single antenna element having a substantially circular horizontal pattern and said second array comprises a binomial expansion of a three-element basic array having a dumbbell-shaped horizontal pattern, the two expansions being of the same order.

5. In a glide path system, the antenna arrangement according to claim 4 wherein said first array consists of a plurality of vertically spaced, substantially identical rows, each representing a binomial expansion of said single antenna element, and said second array consists of a plurality of vertically spaced, substantially identical rows, each representing a binomial expansion of said three-element basic array.

6. In a glide path system, the antenna arrangement according to claim 1 wherein the heights of said two arrays above ground are selected so as substantially to fulfill the equation $$\frac{R2'(\theta)}{R1'(\theta)} = \frac{\sin (hK \cos \theta)}{\sin (HK \cos \theta)}$$

$h$ and $H$ being the height above ground of said first and said second array, respectively, and $K$ being the tangent of the desired glide path angle.

7. In a glide path system, an antenna arrangement including a lower binominal array of the $n$th order, based upon a single antenna of circular horizontal radiation characteristic, and an upper binomial array of the $n$th order, based upon a three-antenna elemental array having a dumbbell-shaped horizontal pattern of radiation, wherein $n$ is an integer greater than zero, the two arrays being in substantial vertical alignment with each other and laterally displaced from a runway intersecting with the glide path.

8. In a glide path system, the antenna arrangement according to claim 7 wherein at least one array consists of a plurality of vertically spaced rows representing identical binomial arrays.

9. In a glide path system, the antenna arrangement according to claim 7 wherein at least said upper array consists of a plurality of antennae horizontally aligned in a direction perpendicular to said runway.

10. An antenna arrangement for glide path systems comprising a first array consisting of at least one antenna, a second array consisting of at least one row of horizontally spaced antennae, said second array being in substantial vertical alignment with and more elevated from ground than said first array, first and second modulating means, a source of radio frequency energy feeding said modulating means, and means for energizing said first and second array from said first and second modulating means, respectively, said energizing means including current distributing means provided at least between said second modulating means and the antennae of said second array whereby the latter antennae may be differently energized to produce a desired pattern of radiation, the relationship between the heights of the two arrays above ground being substantially given by the equation $$\frac{R2'(\theta)}{R1'(\theta)} = \frac{\sin (hK \cos \theta)}{\sin (HK \cos \theta)}$$

$h$ and $H$ being the height above ground of said first and said second array, respectively, K being the tangent of the desired glide path angle, $R1'(\theta)$, $R2'(\theta)$ being the respective horizontal patterns of radiation of said first and said second array, and $\theta$ being a horizontal angle.

11. An antenna arrangement according to claim 10 wherein said current distributing means comprises a dielectric wave guide, an input loop extending into said wave guide, and a plurality of output loops arranged to apply energy from said wave guide to respective antennae, the size of said loops differing with the different amounts of energization required for the associated antennae.

SIDNEY B. PICKLES.

REFERENCES CITED

The following references are of record in the file of this patent:

UNITED STATES PATENTS

| Number | Name | Date |
|---|---|---|
| 2,302,102 | Kandoian | Nov. 17, 1942 |
| 2,307,184 | Alford | Jan. 5, 1943 |
| 2,400,736 | Brown | May 21, 1946 |
| 2,406,734 | Alford | Sept. 3, 1946 |
| 2,418,124 | Kandoian | Apr. 1, 1947 |
| 2,419,562 | Kandoian | Apr. 29, 1947 |
| 2,419,609 | Ullrich | Apr. 29, 1947 |
| 2,422,076 | Brown | June 10, 1947 |